United States Patent [19]

Jimenez et al.

[11] 4,314,515
[45] Feb. 9, 1982

[54] SEED SINGULATOR

[75] Inventors: Miguel A. Jimenez, Douglas, Ariz.; Manuel M. Saucedo, Blythe, Calif.

[73] Assignee: Patrick O. Griffin, Yuma, Ariz.; by said Manuel M. Saucedo

[21] Appl. No.: 93,499

[22] Filed: Nov. 13, 1979

[51] Int. Cl.³ .................... A01C 7/20; A01C 5/06
[52] U.S. Cl. .......................... 111/77; 111/86; 111/10; 221/183; 221/259; 221/277; 222/216; 222/408; 222/414
[58] Field of Search .............. 222/216, 311, 313, 407, 222/408, 414, 290; 221/259, 183, 184, 277; 111/77

[56] References Cited

U.S. PATENT DOCUMENTS

| 487,720 | 12/1892 | Crane | 222/400 X |
|---|---|---|---|
| 1,276,562 | 8/1918 | Nordstrom | 222/408 X |
| 1,934,899 | 11/1933 | White | 222/408 X |
| 2,237,504 | 4/1941 | Roath | 222/313 |
| 2,643,798 | 6/1953 | Neff | 222/313 |
| 2,690,856 | 10/1954 | Trondle | 221/183 |
| 3,028,056 | 4/1962 | Silver | 222/414 X |
| 3,051,291 | 8/1962 | Hennessey | 198/453 |
| 3,913,503 | 10/1975 | Becker | 111/77 |
| 3,913,798 | 10/1975 | Allen | 111/77 X |
| 4,162,744 | 7/1979 | Barker et al. | 111/77 X |

FOREIGN PATENT DOCUMENTS

| 737856 | 7/1951 | Fed. Rep. of Germany | 222/408 |
| 359006 | 1/1962 | Switzerland | 221/259 |

Primary Examiner—Steven A. Bratlie
Attorney, Agent, or Firm—Willis E. Higgins

[57] ABSTRACT

A seed singulator uses two opposing surfaces, one of which has a groove extending across it dimensioned to receive seeds in a single file. The two surfaces are moved relative to each other, with the groove having an angled relationship of less than 90° with the relative direction motion of the two surfaces. Variation of the angle controls spacing between seeds independently of the velocity of relative movement between the surfaces. The surfaces are preferably flat with a centrally disposed seed containing area and the groove extending from that area to the periphery of the surfaces for discharge of the seed. In this form, the relative motion between the surfaces is preferably rotary to provide continuous operation.

4 Claims, 10 Drawing Figures

SEED SINGULATOR

BACKGROUND OF THE INVENTION

1. FIELD OF THE INVENTION

This invention relates to a seed singulator, i.e., apparatus which will deliver seeds one at a time to a desired location. More particularly, it relates to a seed singulator which is especially adapted for delivering small and irregularly shaped seeds one at a time reliably under field conditions. Most especially, it relates to such a seed singulator suitable for the large scale planting of uncoated lettuce seeds and similar difficult to plant seeds.

2. DESCRIPTION OF THE PRIOR ART

Prior to reform of agricultural labor laws to outlaw the so called "short hoe", conventional practice with crops having small and irregularly shaped seeds, such as lettuce, was to plant such seeds in excess, then thin out the seedlings to a desired spacing of, for example, two inches between each plant in a row. Such thinning operations were time consuming, labor intensive and literally back-breaking. With the use of longer handled hoes, the thinning operation could not be accomplished to the desired precision economically.

As a result, attempts were undertaken to provide mechanical seed planters which would provide individual seed at the desired spacing for the seedlings without thinning. Such efforts were soon successful in the case of larger, regularly shaped seeds. Examples of such mechanical seed planters suitable for singulating relatively large, regular shaped seeds are found in, for example, U.S. Pat. Nos. 3,913,503 and 4,162,744. Such seed planters are also employed for planting smaller, irregularly shaped seeds, such as lettuce seeds, through the expedient of coating such seeds with a water soluble material to form a regularly shaped pellet surrounding the seed. However, coating such seeds is expensive and reduces their germination rate because the application of heat is necessary to form the coating pellets. Thus, the use of coated seeds increases the costs of planting by a factor of three or four. In addition, commercially available seed singulators in accordance with the teaching of U.S. Pat. No. 3,913,503 require time consuming precision adjustment to change spacing between seeds and/or between rows of seeds. Such adjustments are usually necessary when changing fields, because different growers usually employ different spacings.

Attempts have also been made to provide seed singulators suitable for use with such hard to plant seeds as uncoated lettuce seeds. An example of such a device is described in, for example, U.S. Pat. No. 3,913,798. Such a device will singulate lettuce seeds provided that the orientation of the unit with respect to a horizontal plane is very accurately controlled. However, maintaining such control in planting fields has proved to be difficult. As a result, the use of such units has not replaced the use of more expensive coated lettuce seed in planters capable of singulating larger, more regularly shaped seeds.

Further, while the article feeding art in general is a well developed one, techniques employed for feeding regularly shaped articles in stationary manufacturing applications, such as taught in U.S. Pat. No. 3,051,291, are not generally applicable to seed singulation under field planting conditions. Thus, while attempts have been made to provide seed singulators for difficult to plant seeds in the past, a need remains for further improvements in seed singulators suitable for planting such seeds.

SUMMARY OF THE INVENTION

Accordingly, it is an object of this invention to provide a seed singulator which is capable of dispensing uncoated lettuce seeds and other small, irregularly shaped seeds one at a time.

It is another object of the invention to provide a seed singulator which is not sensitive to changes in orientation which occur during planting under field conditions.

It is a still further object of the invention to provide such a seed singulator which is easily adjustable to different spacing between seeds and rows of seeds.

The attainment of these and related objects may be achieved through use of the novel seed singulator herein disclosed. This seed singulator has first and second members with opposing mated surfaces, desirably flat, with one of the members having a centrally disposed opening for receiving seeds to be singulated. A groove dimensioned to receive the seeds in single file, i.e., with a width slightly in excess of that of the seed of the type to be singulated, is formed in one of the mated surfaces, leading from the centrally disposed opening to the periphery of the surfaces. A means is provided for moving the surfaces relative to one another in a given direction, preferably rotary, with the groove extending in a direction forming an angle of less than 90° with the given direction. The size of this angle determines the spacing between seeds when the device is operated. The singulator also preferably includes a seed reservoir positioned above the first and second members with an enclosed passageway communicating between the reservoir and the centrally disposed opening and terminating at a given distance above the surface of the member exposed by the centrally disposed opening to provide a predetermined depth of seeds in the opening, independent of the quantity of seeds contained in the reservoir. With this arrangement, it is merely necessary to keep some quantity of seed in the reservoir to assure continuous, uniform operation of the singulator.

In operation, the first and second members are moved relative to one another in the given direction. Seeds in the opening are thus moved against the groove with a component of motion in the direction of the groove. In this manner, the seeds are caused to enter the groove in a single file fashion through the groove for discharge from the singulator, one at a time. If the angle between the relative direction of motion between the first and second members is increased, spacing between the seeds as discharged from the singulator is increased, and if this angle is decreased, the seeds are discharged closer together. In practice, variation in the spacing of seeds of from about 2 cm to about 10 cm may be obtained simply by varying this angle.

The attainment of the foregoing and related objects, advantages and features of the invention should be more readily apparent to those skilled in the art after review of the following more detailed description of the invention, taken together with the drawings, in which:

DETAILED DESCRIPTION OF THE INVENTION

Figure 1:
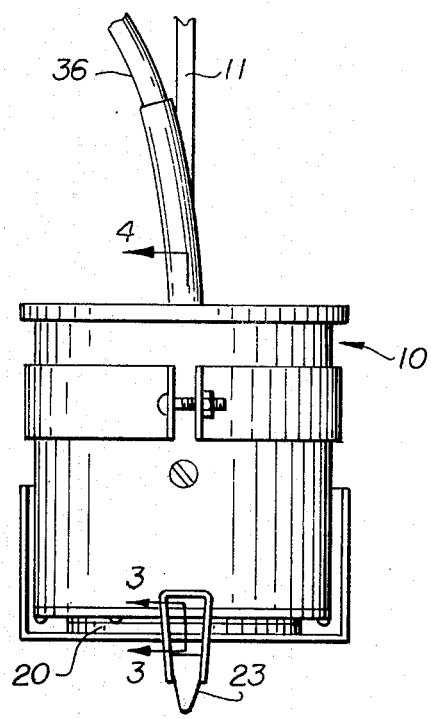
FIG. 1 is a front view of an embodiment of a seed singulator in accordance with the invention.
Figure 2:
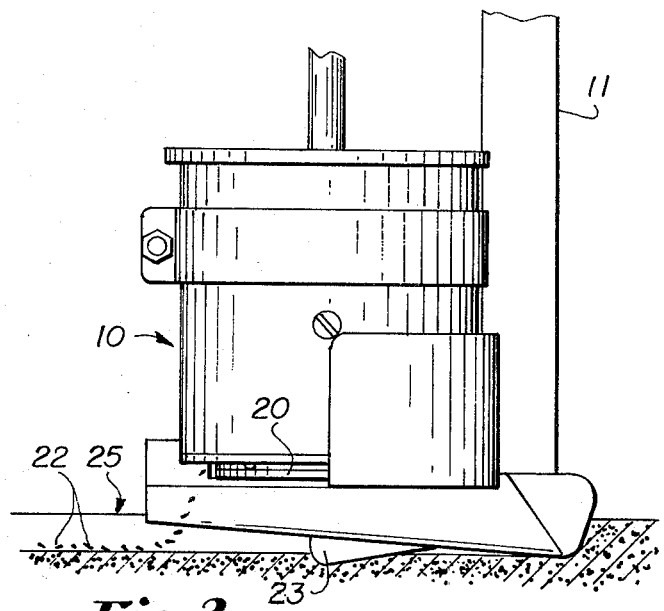
FIG. 2 is a side view of the singulator shown in FIG. 1.

Turning now to the drawings, more particularly to FIGS. 1-5, there is shown a seed singulator in accordance with the invention. The seed singulator includes a housing, indicated generally at 10. A bracket 11 allows housing 10 to be mounted by means of clamps, not shown, to a horizontal bar on a unit pulled by a tractor. The housing 10 is divided into a seed reservoir 12 and a seed enclosure 14, with enclosed passageways 16 communicating between the reservoir 12 and the enclosure 14. The passageways 16 each terminate in an opening 18 at a predetermined distance above the bottom 20 of the enclosure 14. This construction allows a predetermined depth of seeds 22 to be maintained in the enclosure 14, corresponding to the placement of openings 18, independent of the quantity of seed 22 contained in the reservoir 12. Projection 23 plows a furrow 25 for receiving the seeds 22.

Figure 3:
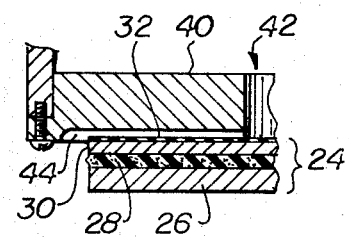
FIG. 3 is a cross section of a portion the singulator shown in FIGS. 1 and 2, taken along the line 3—3 in FIG. 1.

Bottom 20 of the enclosure 14 is a composite flat member 24 (FIG. 3). The composite member 24 consists of a first metal plate 26, a layer 28 of resilient foamed plastic or rubber bonded to the metal plate 26, a second metal plate 30, also bonded to the resilient layer 28, and a smooth, tough paper layer 32 bonded to the second metal plate 30. The layer 32 is softer than the seeds 22 to be singulated and is static free. Other materials beside paper, such as plastic or the like, can be used for the layer 32 as long as they are both softer than the seeds and static free. While the apparatus will singulate seeds successfully without the layer 32, a bare metal surface there will damage a certain percentage of the seeds.

Shaft 34 is integrally formed with flat plate 26 and is coupled to a flexible cable drive 36 at 38. The other end of flexible cable drive 36 is connected to a suitable source of rotary motion (not shown), such as a wheel which rotates when the unit is pulled through a field to be planted. A second flat member 40 with a centrally disposed opening 42 extending through it (best shown in FIG. 6A-6D) to give an essentially toroidal shape, is fixedly mounted in contact with the surface of paper layer 32. A groove 44 extends from the opening 42 through the underside of member 40 beyond the periphery of the first member 24. Groove 44 has a width slightly in excess of the width of a seed 22 to be singulated, but less than the width of two seeds 22, side by side.

As can best be seen in FIGS. 6A-6D, the opening 42 through the second member 40 is somewhat eccentrically disposed with respect to shaft 34 of the first member 24. This means that, as first member 24 rotates in the direction indicated by arrows 46, seeds 22 will be directed toward the edge 47 of the toroidal member 40 as shown in FIGS. 6A-6D. Enclosure 14 with its constant depth of seeds assures constant spacing between seeds, but the spacing is relatively constant even as enclosure 14 empties, as shown in FIGS. 6A-6D.

Another groove 48 is shown opposite to the groove 44. If the rotation of the first member 24 is reversed from that indicated by arrows 46, the seeds 22 will be fed to and discharged from the groove 48.

The grooves 44 and 48 form angles 50 and 52, respectively, of less than 90° with respect to a line drawn tangent to the intersection of the grooves 44 and 48 with edge 47, i.e., the direction of rotation of the first member 24 has a component extending along a direction of the grooves 44 and 48. These angles are less than 90° because the grooves 44 and 48 are spaced from center line 54 drawn through shaft 34 parallel to the grooves. The further the grooves 44 or 48 are away from this center line, the more acute is angle 50 or 52. As angles 50 and 52 decrease, the spacing between seeds 22 fed through the grooves decreases. Additional grooves 56 and 58 are shown on the upper surface of second member 40, each located a different distance from its parallel center line 60. When it is desired to plant seeds at a different spacing than obtainable with either groove 44 or 48, the member 40 can be inverted to place grooves 56 and 58 in opposing relationship with the surface of paper 32. Thus, the four grooves 44, 48, 56 and 58 can be employed to provide a different spacing for singulated seeds 22 fed with the device. The groove 44 spaces the seeds closest together, because its angle 50 is the most acute, while groove 58 spaces the seeds the greatest extent, since its corresponding angle is closest to 90°. The different spacings so provided are constant, depending only on the acuteness of this angle. Different speeds of rotation of the first member 24 or tilting of the apparatus through variations from the horizontal normally encountered under field conditions do not alter the spacings provided between the seeds 22 with the different grooves.

Figure 4:
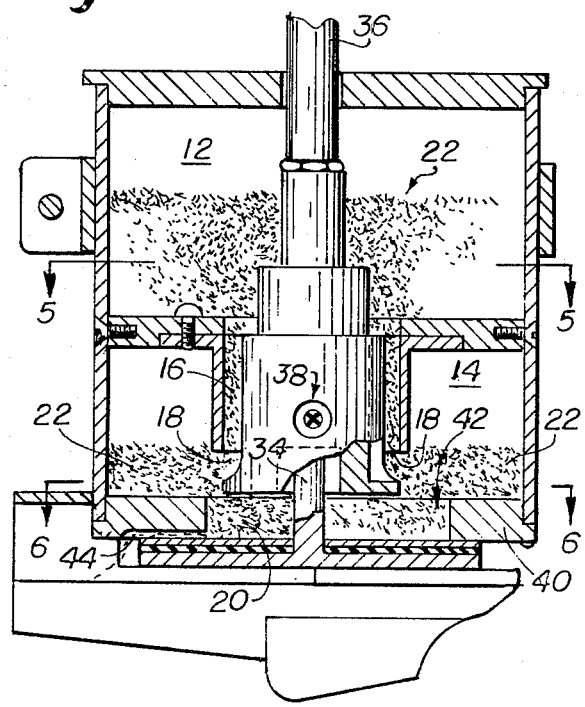
FIG. 4 is a cross section of the embodiment shown in FIGS. 1 and 2.
Figure 5:
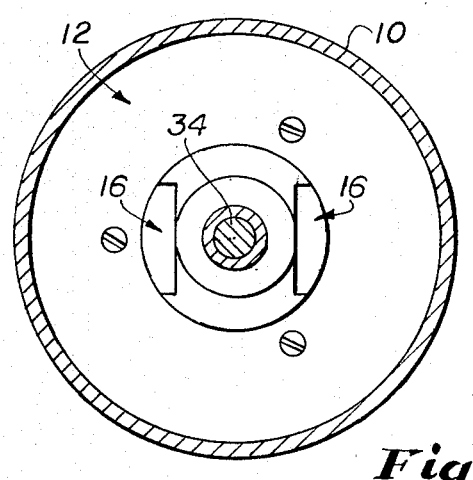
FIG. 5 is a section view taken along the line 5—5 in FIG. 4.
Figure 6A:
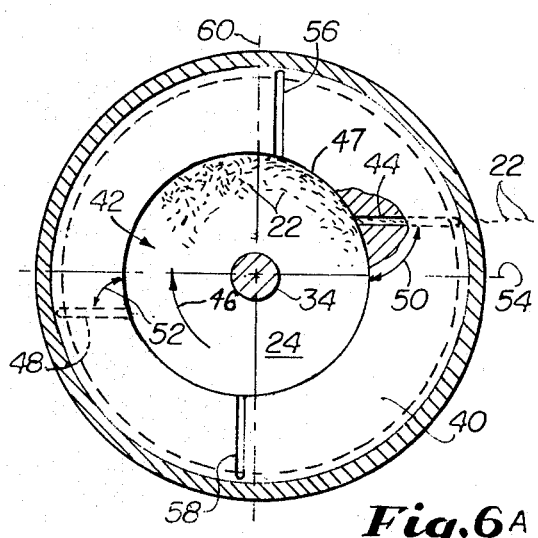
FIGS. 6A through 6D are section views taken along the line 6—6 in FIG. 4, showing operation of the apparatus.
Figure 6B:
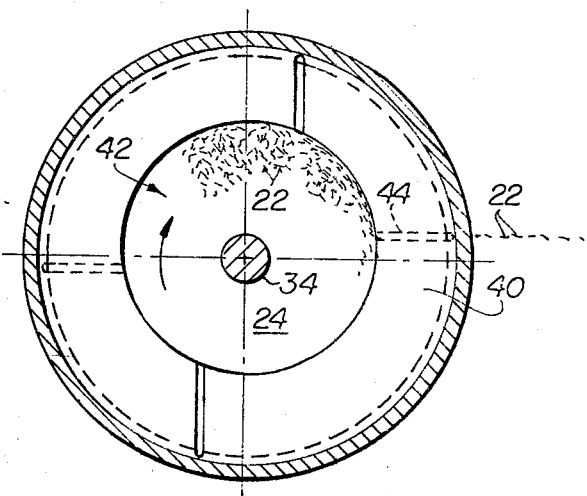
Figure 6C:
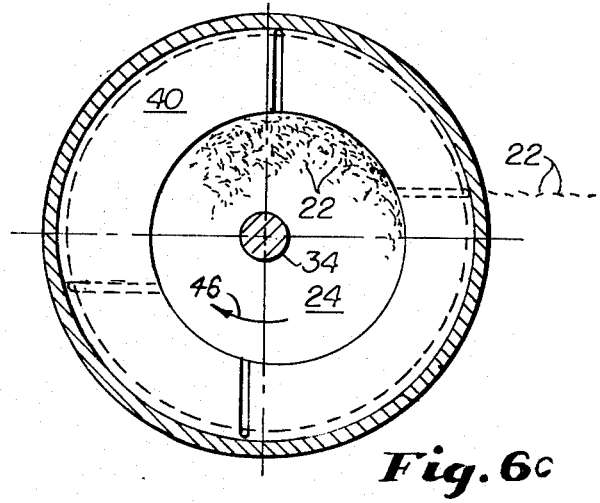
Figure 6D:
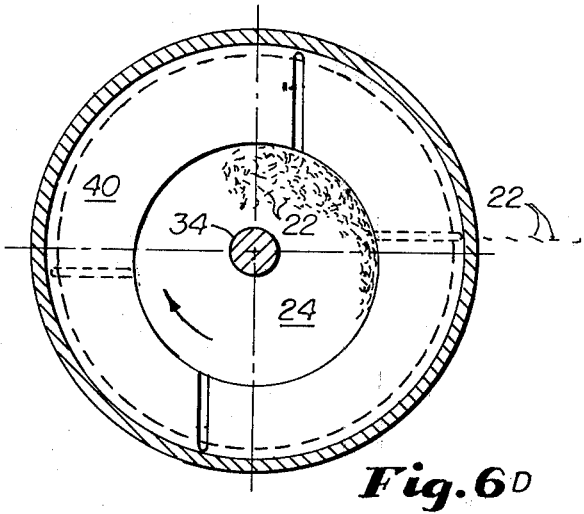
Figure 7:
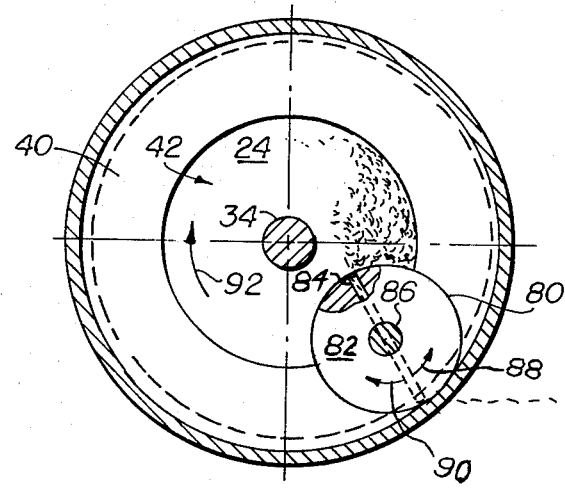
FIG. 7 is a similar section view as in FIGS. 6A through 6D, but of another embodiment of the invention.

FIG. 7 shows a section view similar to that of FIGS. 6A-6D of another embodiment of the invention, in which the spacing between seeds 22 singulated through use of the device is more easily adjusted. The construction of this embodiment is essentially identical with that shown in FIGS. 1-6D, except for the elements shown in FIG. 7. Opening 42 in FIG. 4 is centrally disposed with respect to shaft 34 of first member 24. A cut-out portion 80 is provided in the second, toroidal shaped member 40. A flat disc 82 fits into the cut-out portion 80 and has a groove 84 extending through its mating surface with the surface of member 24. A shaft 86 is mounted to disc 82 and extends upward through housing 10 (FIG. 1) to allow rotation of the disc 82 as indicated by arrows 88 and 90, thus changing the angle of the groove 84 with respect to the direction of rotation of first member 24, as indicated by arrow 92. With this embodiment, the spacing between seeds 22 singulated with the apparatus may be adjusted to any amount within minimum and maximum limits. Typically, those minimum and maximum limits may vary between about one centimeter and fifteen centimeters. Moving the disc 82 from the position shown in the direction of arrow 90 decreases the spacing between seeds 22, while moving it in the direction indicated by arrow 88 increases the spacing.

It should now be readily apparent to those skilled in the art that a seed singulator capable of achieving the stated objects of the invention has been provided. This apparatus will dispense uncoated lettuce seeds and other small, irregularly shaped seeds one at a time at various desired spacings. It is not sensitive to changes in orientation from the horizontal encountered under field planting conditions. In addition to being easily adjustable for different spacing between seeds, plural independent units in accordance with the invention can be mounted on a unit to be pulled through the field by a tractor, with different desired spacings between the units being easily obtained, corresponding to different spacing desired between rows of seeds planted with the apparatus.

It should further be apparent to those skilled in the art that various changes in form and details of the invention may be made. It is intended that such changes be included within the spirit and scope of the claims appended hereto.

What is claimed is:

1. A seed singulator which comprises:
    (a) a first member having an upwardly facing flat surface,
    (b) a second member having a flat surface with a groove extending across the flat surface and having a width dimensioned to receive seeds of the type to be singulated in a single file, the flat surface of said second member being positioned on a first part of the flat surface of said first member so that a first portion of the flat surface of said second member including an end of the groove extends beyond the flat surface of the first member and the end of the groove extends beyond said first member,
    (c) means for supplying seeds to a second part of the flat surface of said first member,
    (d) means for moving said first and second members relative to each other to move the seeds toward the groove in a direction having a component along the groove, the groove forming an angle of less than 90 degrees relative to the direction of motion between said first and second members, the motion between said first and second members being rotary about a first axis, said second member having an opening eccentrically disposed relative to the axis, which opening defines the second part of the flat surface of said first member,
    (e) means for adjusting the angle the groove forms with respect to the direction of motion between the first and second members,
    (f) a seed reservoir positioned above said first and second members, an enclosure between said seed reservoir and said first and second members, and an enclosed passageway communicating between said reservoir and said enclosure, said passageway terminating at a given distance above said first member to provide a predetermined depth of seeds in said enclosure independent of quantity of seeds in said reservoir, and
    (g) means for forming a furrow to receive the seeds from the end of the groove.

2. The seed singulator of claim 1 in which said first member is positioned on a resilient supporting means to maintain good contact between the opposing flat surfaces.

3. The seed singulator of claim 1 in which the flat surface of said first member comprises a tough, smooth paper.

4. The seed singulator of claim 1 in which the means for adjusting the angle the groove forms includes a second portion of said second member, which second portion includes the groove, the second portion being independently rotatable about a second axis to change the angle the groove forms relative to the direction of rotation about the first axis.

* * * * *